(12) United States Patent
Ghannam et al.

(10) Patent No.: US 9,174,597 B2
(45) Date of Patent: Nov. 3, 2015

(54) ELECTRO-MECHANICAL PROTECTOR FOR VEHICLE LATCHES DURING CRASH CONDITIONS AND METHOD FOR OPERATING THE SAME

(75) Inventors: Mahmoud Yousef Ghannam, Canton, MI (US); Todd N. Clark, Dearborn, MI (US); David J. Tippy, Ann Arbor, MI (US); Matt A. Niesluchowski, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1617 days.

(21) Appl. No.: 11/789,754

(22) Filed: Apr. 25, 2007

(65) Prior Publication Data

US 2008/0269990 A1    Oct. 30, 2008

(51) Int. Cl.
*G06F 17/00*    (2006.01)
*B60R 21/0132*   (2006.01)
*B60R 21/0134*   (2006.01)
*B60R 21/00*     (2006.01)
*B60R 21/01*     (2006.01)

(52) U.S. Cl.
CPC ..... *B60R 21/0134* (2013.01); *B60R 2021/0027* (2013.01); *B60R 2021/01252* (2013.01)

(58) Field of Classification Search
CPC ............. B60R 2021/0027; B60R 2021/01252; B60R 2021/01315; B60R 2021/028; B60R 21/0134; B60R 21/0132; B60R 21/017
USPC ........................................... 701/145; 180/282
See application file for complete search history.

(56) References Cited

U.S. PATENT DOCUMENTS

| | | | | |
|---|---|---|---|---|
| 3,151,698 | A * | 10/1964 | Pollock | 180/281 |
| 3,468,392 | A * | 9/1969 | Hass | 180/281 |
| 3,630,305 | A * | 12/1971 | Kazaoka | 180/289 |
| 3,695,381 | A * | 10/1972 | Okada et al. | 180/281 |
| 3,906,870 | A * | 9/1975 | Alberti | 410/79 |
| 3,990,531 | A * | 11/1976 | Register | 180/281 |
| 5,526,710 | A * | 6/1996 | Ohta | 74/89 |
| 5,586,646 | A * | 12/1996 | Bridgeman et al. | 200/541 |
| 6,312,045 | B2 * | 11/2001 | Kitagawa | 296/187.12 |
| 7,341,289 | B2 * | 3/2008 | Schretzlmeier et al. | 292/92 |
| 2002/0111756 | A1 * | 8/2002 | Modgil | 702/63 |
| 2004/0138843 | A1 * | 7/2004 | Bouamra et al. | 702/94 |
| 2005/0154512 | A1 * | 7/2005 | Schubert et al. | 701/38 |
| 2005/0218663 | A1 | 10/2005 | Schupp et al. | |
| 2006/0049639 | A1 | 3/2006 | Menke et al. | |

* cited by examiner

*Primary Examiner* — Mussa A Shaawat
*Assistant Examiner* — Kyung Kim
(74) *Attorney, Agent, or Firm* — Frank A. MacKenzie; Brooks Kushman, P.C.

(57) ABSTRACT

The present invention relates to an electronic mechanical protector system for vehicle door latches during crash conditions, vehicle door equipped with such a system, and methods for operating the system.

15 Claims, 3 Drawing Sheets

ELECTRO-MECHANICAL PROTECTOR FOR VEHICLE LATCHES DURING CRASH CONDITIONS AND METHOD FOR OPERATING THE SAME

TECHNICAL FIELD OF THE INVENTION

The present invention relates to an electro-mechanical door safety latch mechanism for use in vehicle doors. The mechanism operates to secure the vehicle door during pre-crash and crash conditions, and to release the vehicle door latch after the pre-crash or crash condition has passed to permit operation of the vehicle door.

The present invention further relates to a vehicle door safety system comprised of a vehicle door, an electro-mechanical apparatus responsive to signals from sensors to engage a vehicle door latch during pre-crash threat events and crash events, and to release the door latch during post crash events to permit operation of the vehicle door latch post crash.

The present invention further relates to a method to operate an electro-mechanical apparatus responsive to signals indicative of a pre-crash threat event or a crash event to secure a door latch, and to release the door latch once the pre-crash threat event has lapsed or, in the event of a crash, during the post crash event.

BACKGROUND OF THE INVENTION

Safety features have assumed an ever greater aspect of automotive vehicle manufacture. Governmental regulations and consumer preferences have directed all manufacturers of automobile vehicles to design safety feature to promote greater vehicle occupant safety in the event of a crash event. Active and passive safety systems, blindspot detection systems, and adaptive cruise control are all very important safety features that are designed to promote greater vehicle occupant safety in the event a pre-crash or crash event occurs. One area where improvement may be had is in the area of vehicle door condition during crash events.

There is a continuing effort to improve vehicle door safety so that the vehicle doors do not open during a crash event, yet will open after a crash event has occurred. It has been a challenge to reliably define crash and non-crash events and to translate such events to vehicle door safety mechanisms and systems. The present invention is an improvement in vehicle door safety during pre-crash and crash events that uses the Restraint Control Module (RCM) to receive input from various sensors and safety devices and to use that information to determine when to latch and control the latch mechanism during pre-crash threat events and crash events, and release the door latch during post crash events.

BRIEF SUMMARY OF THE INVENTION

In one aspect, the present invention relates to an electronic mechanical protector system for vehicle door latches during vehicle crash conditions. The system comprises a Restraint Control Module (RCM) having memory and tables therein, said restraint control module electronically connected to at least one sensor to transmit data signals from said sensors to said restraint control module during pre-crash, crash and post crash events; said restraint control module further electronically connected to an electro-mechanical apparatus; said apparatus is responsive to electrical signals from said restraint control module to transfer said sensor signal to mechanical energy to secure a vehicle door latch to prevent said door from opening during crash events and permitting said door latches to operate during post crash events to open said vehicle door.

In another aspect, the present invention relates to a vehicle door safety system, comprising a vehicle door pivotally connected at one end to a vehicle support member and equipped at its opposite end with a vehicle door latch mechanism comprised of a latch with a detent; said latch cooperatively engagable with a striker positioned on said vehicle; a Restraint Control Module (RCM) having memory and tables therein, at least one sensor electronically connected to said RCM to transmit data signals from said sensors to said RCM during pre-crash, crash and post crash events; an electro-mechanical apparatus; said apparatus responsive to electrical signals from said RCM to transfer said sensor data signal to mechanical energy to secure a vehicle door latch to prevent said door from opening during crash events and pre-crash events and permitting said door latches to operate during post crash events to open said vehicle door.

In another aspect, the present invention relates to a method to operate a vehicle door latch safety system to prevent said door latch from operating during pre-crash and crash events, comprising; determining whether a pre-crash threat event is imminent; engaging an electro-mechanical safety apparatus to engage said latch to prevent said door latch from operating to open said door; determining whether a crash event has occurred; determining whether a post crash event has occurred; releasing said electro-mechanical safety device to permit operation of the vehicle door latch.

BRIEF DESCRIPTION OF THE DRAWINGS

FIG. 2A is a detailed view of a section of FIG. 2 showing the door panel and door latch.

DETAILED DESCRIPTION OF THE INVENTION

Figure 1:
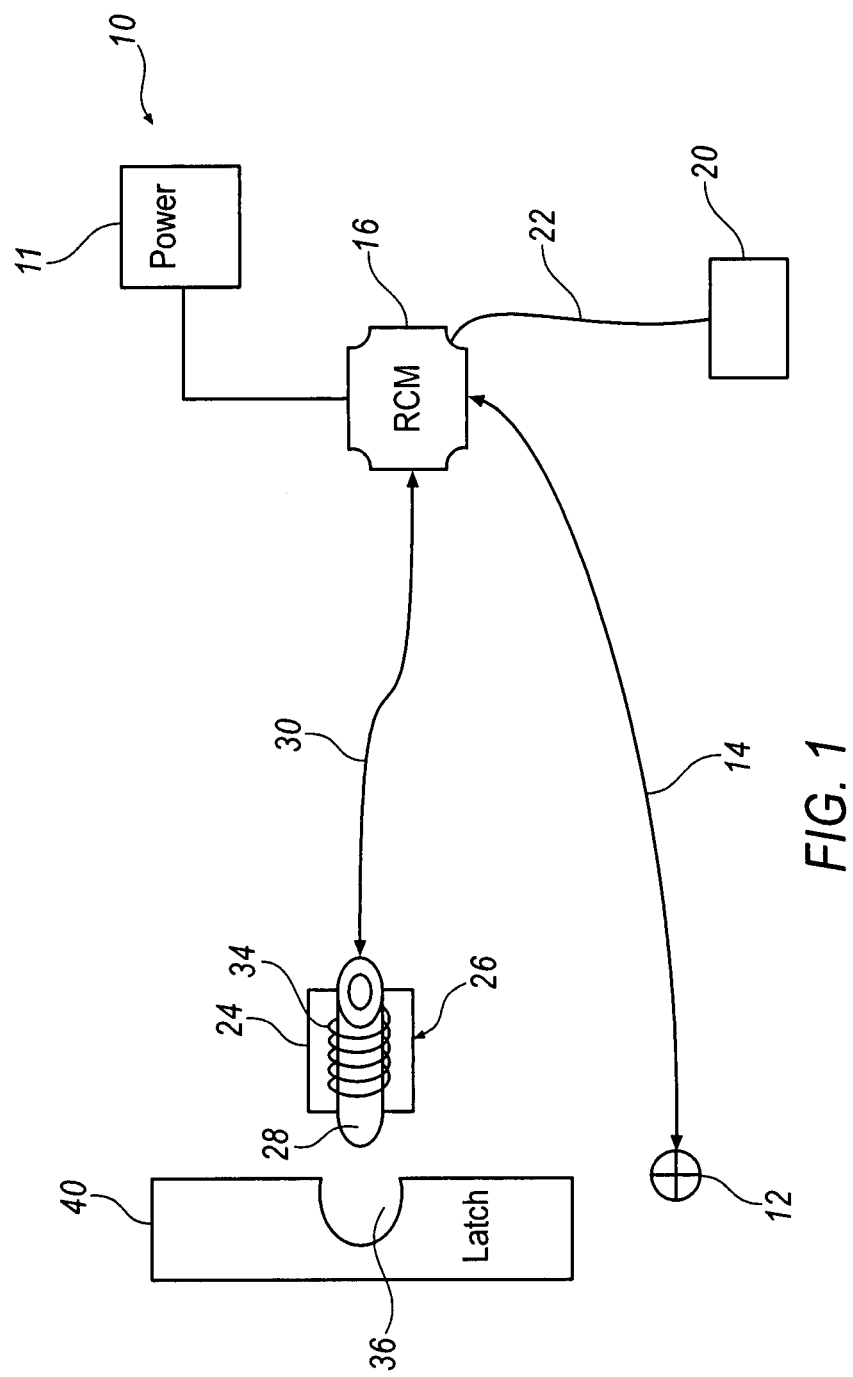
FIG. 1 is a diagrammatic block overview representation of one aspect of a electro-mechanical protector system for vehicle door latches of the present invention.

Turning now to the drawings wherein like numbers refer to like structures, FIG. 1 is diagrammatic overview of the electro-mechanical protector system for vehicle door latches of the present invention.

Figure 2:
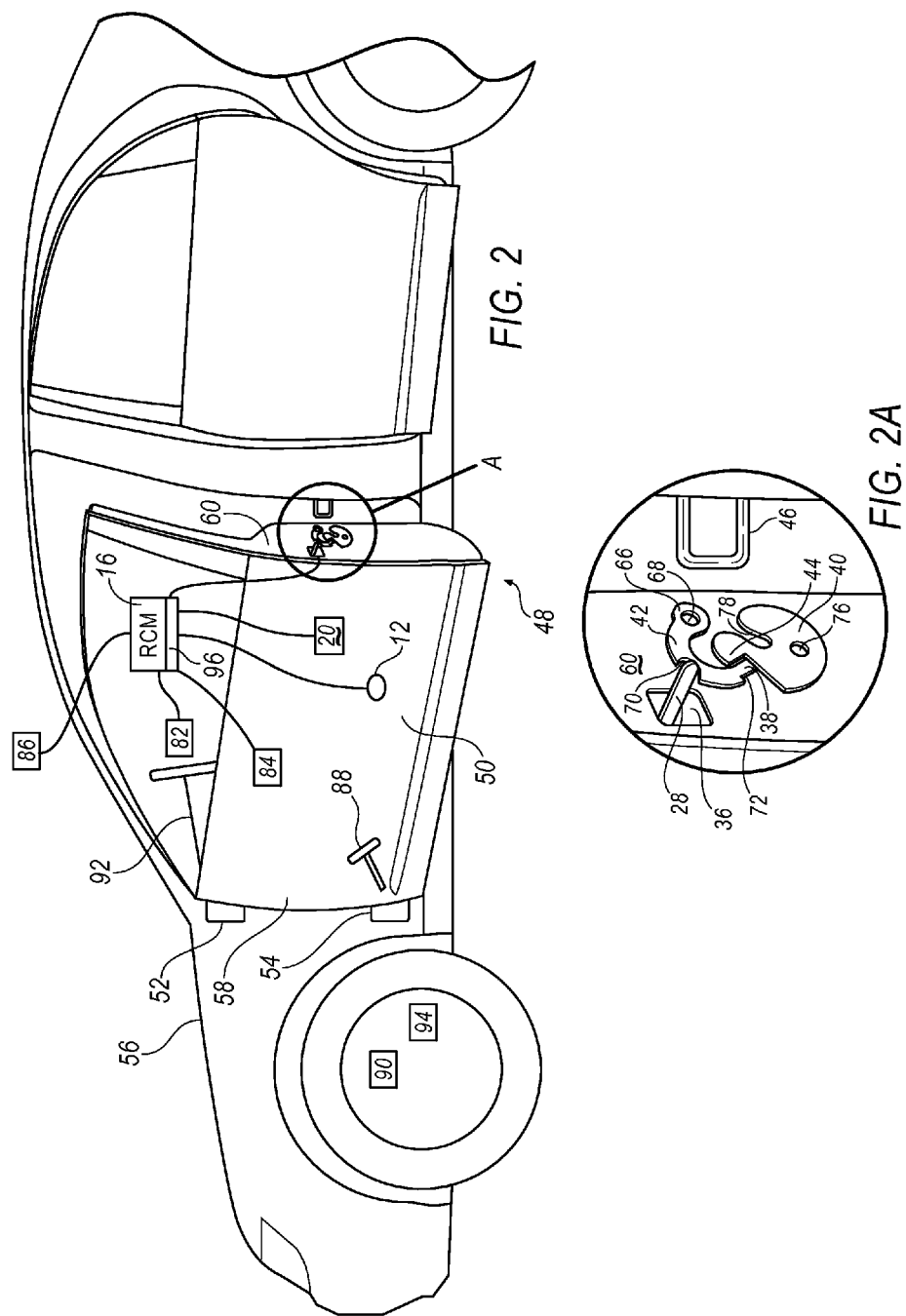
FIG. 2 is a representation of a vehicle door equipped with an electro-mechanical protector system of the present invention.

Specifically, system 10 is comprised of at least one sensor 12 electronically connected via connection 14 to a RCM 16. It is understood that the RCM and various sensors are powered by source 11, which may be the vehicle battery or other power component of the vehicle electrical system. The RCM has a memory and tables resident therein, wherein various commands and data may be stored to determine what commands the RCM may give to the electro-mechanical apparatus 26 to move plunger mechanism responsive to pre-crash threat events and crash event and post crash events, as will be more fully set forth in discussion regarding FIG. 3 into engagement with a vehicle latch mechanism, or with a pawl that engages a vehicle door latch to prevent the latch from operating during pre-crash and crash events, yet permit the latch to operate post crash or during normal vehicle operating conditions. In this representation, the sensor may be a pressure sensor or an acceleration sensor or any other suitable sensor. These sensors find great application in automotive vehicle doors as side impact sensors. In addition, a remote accelerometer 20 electronically connected via 22 to the RCM may also be included in the system to provide information and data concerning vehicle longitudinal and latitudinal acceleration. Those skilled in the art recognize that acceleration as used herein is also meant to include deceleration. A solenoid mechanism 24 having a plunger 28 reciprocably moveable relative to the solenoid in response to electrical signals from the RCM is electrically connected to the RCM by connection 30. The plunger is shown as a coil spring biased plunger mechanism comprised of a plunger 28, and spring bias 34 all within a cavity 36. The cavity may be a housing, it may be a cavity in a vehicle door or door pillar as seen in FIG. 2, or it may be within a housing for insertion into a cavity. The electro-mechanical apparatus 26 engages the plunger to adjustably move the plunger into cooperative engagement with a detent 38 in a door latch 40, to prevent the latch from disengagement with the striker responsive to signals from the RCM indicative of a pre-crash threat event or a crash event, yet permit disengagement responsive to signals from the RCM indicative of post crash event or the passing of a pre-crash threat event as will be explained more fully in response to FIG. 3. More preferably, and in reference to FIG. 2A, the solenoid moves the plunger in response to electrical signals from the RCM into engagement with a pawl 42 having a door latch engagement flange 44 that engages the door latch in detent 38, to prevent operation of the latch and disengagement from the striker. The RCM actuates the plunger mechanism, at least in part, responsive to signals received from the accelerometer, as well as at least one of the sensors. It is further contemplated that other inputs to the RCM from Passive Safety Systems, Blindspot Detection Systems and Adaptive Cruise Systems could be made to actuate the electro-mechanical apparatus of the present invention.

Turning now to FIGS. 2 and 2A, there is represented therein a vehicle door safety system. Specifically, vehicle door system 48 is comprised of a vehicle door 50 pivotally attached at hinges 52, 54 to a vehicle 56 at one end 58, and is equipped at its opposite end 60 with a latch 40, engageable with a striker 46 attached to the vehicle in a location cooperative with the latch so that the latch engages the striker to secure the door in a closed position. The latch is further equipped with a detent 38 that is engageable with a pawl 42, pivotally moveable at one end 66 about pivot 68, and equipped at its opposite end with a detent 70 into which the solenoid plunger 28 cooperatively engages during operation. The pawl has a door latch engagement 72 that engages flange 44 on the door latch to prevent the door latch from rotation about pivot 76 to release the striker from the striker detent 78. It is further contemplated that the pawl may not be necessary in some applications, and the solenoid plunger mechanism may be directly engageable with the latch at a detent to prevent the operation of the door latch in a manner to be hereinafter described.

The vehicle door is further equipped with at least one sensor 12, that may be a pressure sensor or an accelerometer sensor or any other type of sensors. The sensor is electronically attached to an RCM 16 and transmits data signals to the RCM indicative of a crash event. The RCM may optionally be further electronically connected to a Lane Departure Warning System 82, a Blindspot Detection system 84, an Adaptive Cruise System 86, as well as the brake pedal 88, to determine position of the brake pedal, vehicle brakes 90, to determine brake pressure, steering wheel 92, to determine the angle of the steering wheel, wheel speed sensors 94, to determine wheel speed and vehicle roll rate, and a remote accelerometer 20 to determine longitudinal and latitudinal acceleration and/or deceleration. The RCM further may have a memory 96, which may be PROM, EPROM, EEPROM or Flash, or any other memory, with tables resident therein which have data and programs to permit the RCM to process incoming data signals from the components and systems listed above to determine whether a pre-crash threat event is occurring, or whether a crash event has occurred, or whether a vehicle is in a post crash event. The RCM is electronically connected to electro-mechanical protector safety apparatus.

As used herein pre-crash threat events are those conditions or events, as detected by one of the systems mentioned above, that indicate that a crash between the vehicle and an object is imminent. Crash event conditions, as used herein, are those conditions or events, as detected by one of the systems as set forth above, which indicate the vehicle is in a collision with another object. Post crash event conditions, as used herein are those conditions that indicate the crash condition has ended, as detected by the aforementioned systems.

Figure 3:
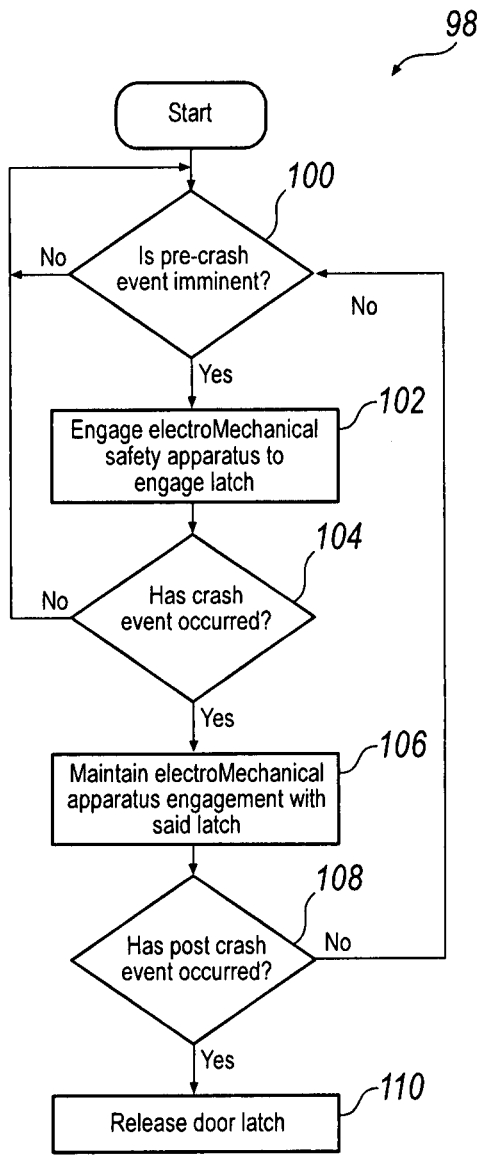
FIG. 3 is a software flow chart of one method of operating a vehicle door safety system of the present invention.

Turning now to FIG. 3, there is shown a representation of a software flow chart showing one method of operation of the electro-mechanical protector system of the present invention.

Specifically, method 98 begins with step 100 which is determining whether a pre-crash threat event is imminent. The system determines whether a pre-crash threat event is imminent by processing inputs from at least one of the Lane Departure Warning System, Blindspot Detection System, Adaptive Cruise Control, brake pedal position, brake pressure, steering wheel angle, wheel speed, latitudinal and longitudinal acceleration/deceleration, crash sensor input such as pressure from side impact crash sensors, as well as input from accelerometer sensors. The RCM processes these signal inputs and makes a determination whether they constitute a pre-crash threat event. If it is determined that a pre-crash threat event is imminent, step 102 is engaging the electro-mechanical safety apparatus to cooperatively engage the detent in the vehicle door latch pawl to prevent opening of the vehicle door. If there is no pre-crash event, the RCM disengages the door latch mechanism and the software loops back to the start point. Step 104 is determining whether a crash event has occurred. If it is determined that a crash event has occurred, step 106 is maintaining the electro-mechanical safety apparatus in cooperative engagement with the vehicle latch detent. If there is no crash event, the software loops back to the start. Step 108 is determining whether a post crash event has occurred. In this step, the RCM determines whether the crash event has ended. This is done by processing accelerometer input from the accelerometer and the accelerometer sensors or from the aforementioned systems to determine whether the vehicle has stopped moving. If it determined that a post crash event has occurred, step 110 is releasing the electro-mechanical safety device from cooperative engagement with the latch detent to permit operation of the vehicle door. If it is determined that a post crash event has not occurred, the software loops back to step 100.

While the invention has been described in detail with regard to at least one embodiment, those skilled in the art recognize that the words used herein are words of description, and not words of limitation. Many variations and modifications are possible without departing from the scope and spirit of the invention as set forth in the appended claims.

What is claimed as new and desired to be protected by Letters Patent of the United States is:

1. A vehicle door latch crash condition protector system, comprising:
    a Restraint Control Module (RCM) having memory and data tables stored therein and configured to:
        receive data from at least one vehicle sensor, and determine pre-crash, crash and post-crash events based on said received data and said data tables;
a vehicle door latch configured to engage a striker of a vehicle door to secure the vehicle door in a closed position;
a pawl pivotably movable between a locked position, in which said pawl engages said latch to retain the striker and secure the vehicle door closed, and an unlocked position, in which said pawl disengages from said latch allowing said latch to release the striker and open the door; and
a latch protector apparatus configured to:
receive an indication from the RCM indicative of at least one of a pre-crash event and a crash event,
based on said indication, engage a plunger into a detent of said pawl to inhibit rotational motion of said pawl from the locked position into the unlocked position, thereby preventing said door from opening,
receive a second indication from the RCM indicative of a post-crash event, and
based on said second indication, disengage said plunger from said detent of said pawl, thereby permitting said vehicle door to open.

2. The protector system of claim 1, wherein said at least one vehicle sensor includes a pressure sensor.

3. The protector system of claim 1, wherein said at least one vehicle sensor includes an accelerometer sensor.

4. The protector system of claim 1, further including an accelerometer configured to detect lateral and longitudinal acceleration of said vehicle;
said accelerometer electronically connected to said RCM to transmit data to the RCM;
said RCM further configured to determine pre-crash, crash and post-crash events based at least in part on data received from said accelerometer.

5. The protector system of claim 1, wherein said plunger is in a housing reactive to a motor, said motor responsive to indications from said RCM to reciprocate said plunger into and out of engagement with said pawl detent according to data received from said at least one sensor indicative of pre-crash, crash and post-crash events.

6. The protector system of claim 1, wherein said plunger includes a spring in cooperative engagement with said plunger to assist in deployment of the plunger into engagement with the pawl detent during pre-crash and crash events.

7. The protector system of claim 1, wherein said RCM receives data from at least one of a Lateral Warning System, a Blindspot Detection System, and an Adaptive Cruise Control, the data including information with respect to at least one of: brake pressure, brake pedal position, steering wheel angle, wheel speed, vehicle roll rate, and lateral and longitudinal acceleration, the data being used by the RCM to predict pre-crash events to determine whether to activate said latch protector apparatus to prevent operation of said vehicle latch.

8. A vehicle door safety system, comprising:
a vehicle door pivotally connected at one end to a vehicle support member and equipped at its opposite end with a vehicle door latch mechanism including a latch configured to engage a striker to secure the vehicle door in a closed position and a pawl pivotably movable between a locked position, in which said pawl engages said latch to retain the striker and secure the vehicle door closed, and an unlocked position, in which said pawl disengages from said latch allowing said latch to release the striker and open the door;
a Restraint Control Module (RCM) having memory and tables therein;
at least one sensor electronically connected to said RCM to transmit data from said sensors to said RCM during pre-crash, crash and post-crash events; and
a latch protector apparatus configured to:
receive an indication from the RCM indicative of at least one of a pre-crash event and a crash event,
based on said indication, engage a plunger into a detent of said pawl to inhibit rotational motion of said pawl from the locked position into the unlocked position thereby preventing said door from opening,
receive a second indication from the RCM indicative of a post-crash event, and
based on said second indication, disengage said plunger from said detent of said pawl, thereby permitting said vehicle door to open.

9. The vehicle door safety system of claim 8, further including an accelerometer electronically connected to said RCM;
said accelerometer to detect and transmit vehicle lateral and longitudinal acceleration to said RCM;
said RCM further configured to determine pre-crash, crash and post-crash events based at least in part on data received from said accelerometer.

10. The vehicle door safety system of claim 8, wherein said at least one vehicle sensor includes a pressure sensor.

11. The vehicle door safety sensor of claim 8, wherein said at least one vehicle sensor includes an acceleration sensor.

12. The vehicle door safety system of claim 8, wherein said plunger is in a housing responsive to indications from said RCM to reciprocate said plunger into and out of engagement with said pawl detent according to data received from said at least one sensor indicative of pre-crash, crash and post-crash events.

13. The vehicle door safety system of claim 12, wherein said plunger includes a spring in cooperative engagement with said plunger to assist in deployment of the plunger into engagement with the pawl detent during pre-crash and crash events.

14. The vehicle door safety system of claim 8, wherein said RCM receives data from at least one of a Lateral Warning System, a Blindspot Detection System, and an Adaptive Cruise Control System, the data including information with respect to at least one of: brake pressure, brake pedal position, steering wheel angle, wheel speed, vehicle roll rate, and lateral and longitudinal acceleration, the data being used by the RCM to predict pre-crash events to determine whether to activate said latch protector apparatus to prevent operation of said vehicle latch.

15. A method to operate a vehicle door latch safety system to prevent said door latch from operating during pre-crash and crash events, comprising;
determining, by a Restraint Control Module (RCM), that a pre-crash threat event is imminent;
providing an indication from the RCM indicative of the pre-crash event to a latch protector apparatus, the latch protector apparatus, based on said indication, engaging a plunger into a detent of a pawl to inhibit rotational motion of said pawl from a locked position, in which said pawl engages said latch to retain a striker of a vehicle door securing the vehicle door in a closed position, and an unlocked position, in which said pawl disengages from said latch allowing said latch to release the striker and open the door;
receiving a second indication from the RCM indicative of a post-crash event; and based on said second indication, disengaging said plunger from said detent of said pawl, thereby permitting said vehicle door to open.

\* \* \* \* \*